Patented July 6, 1943

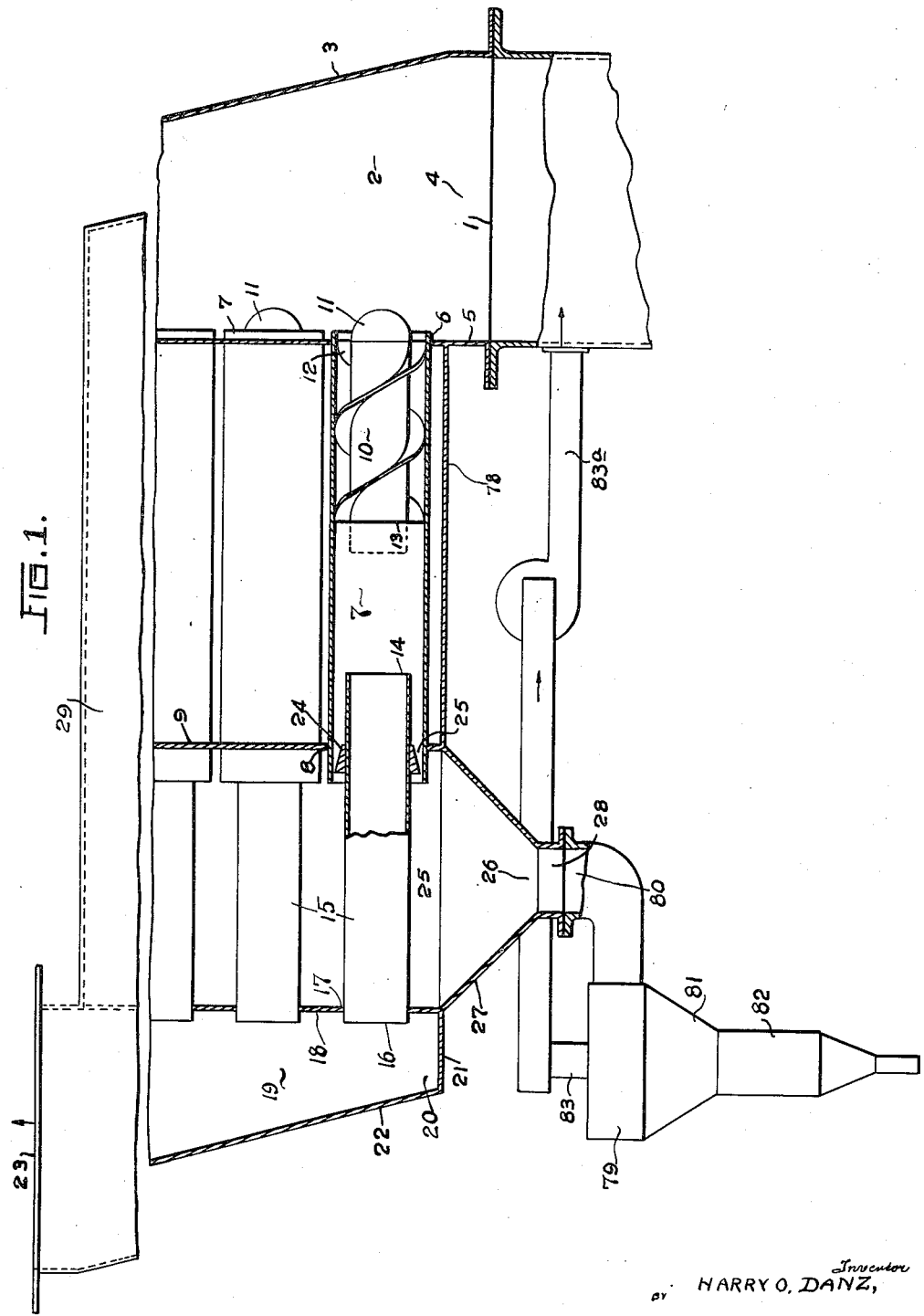

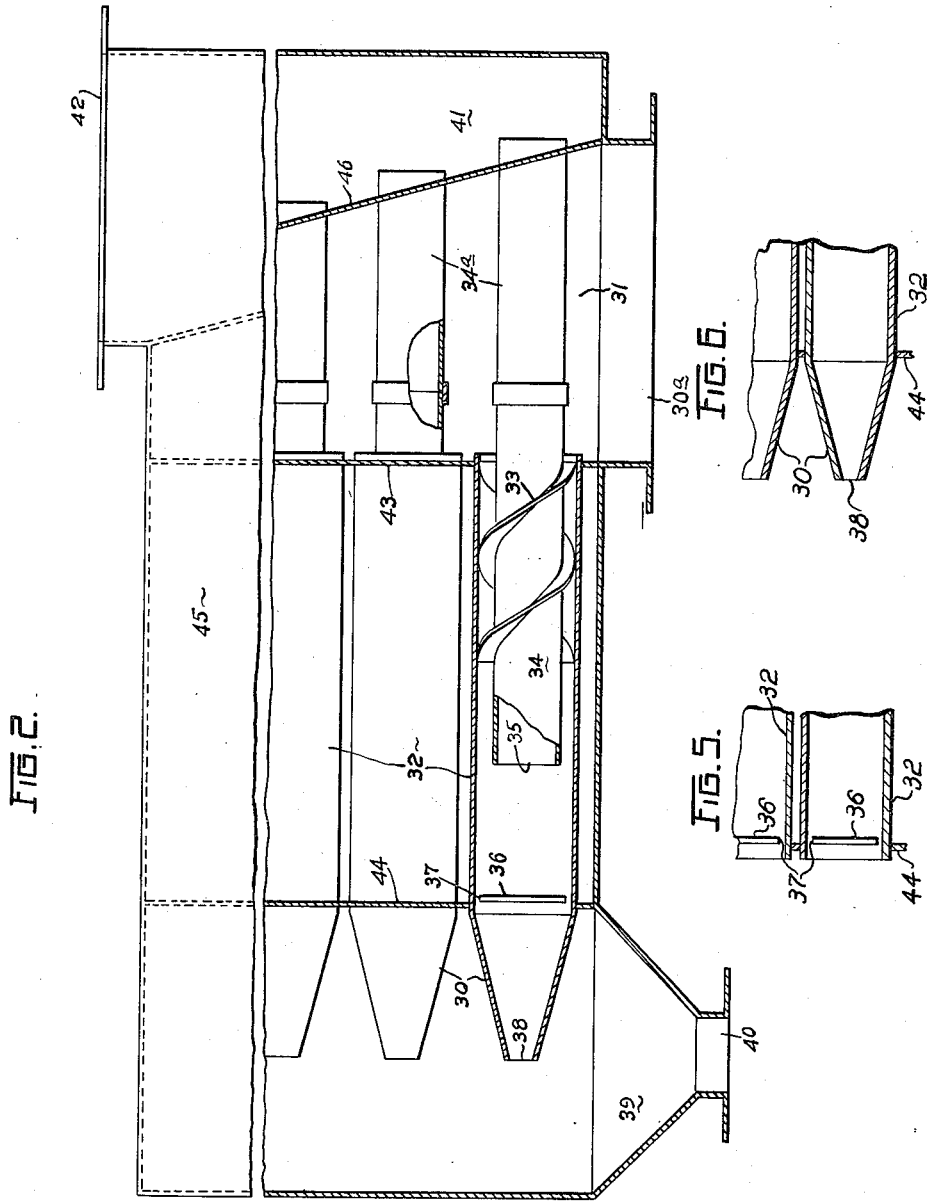

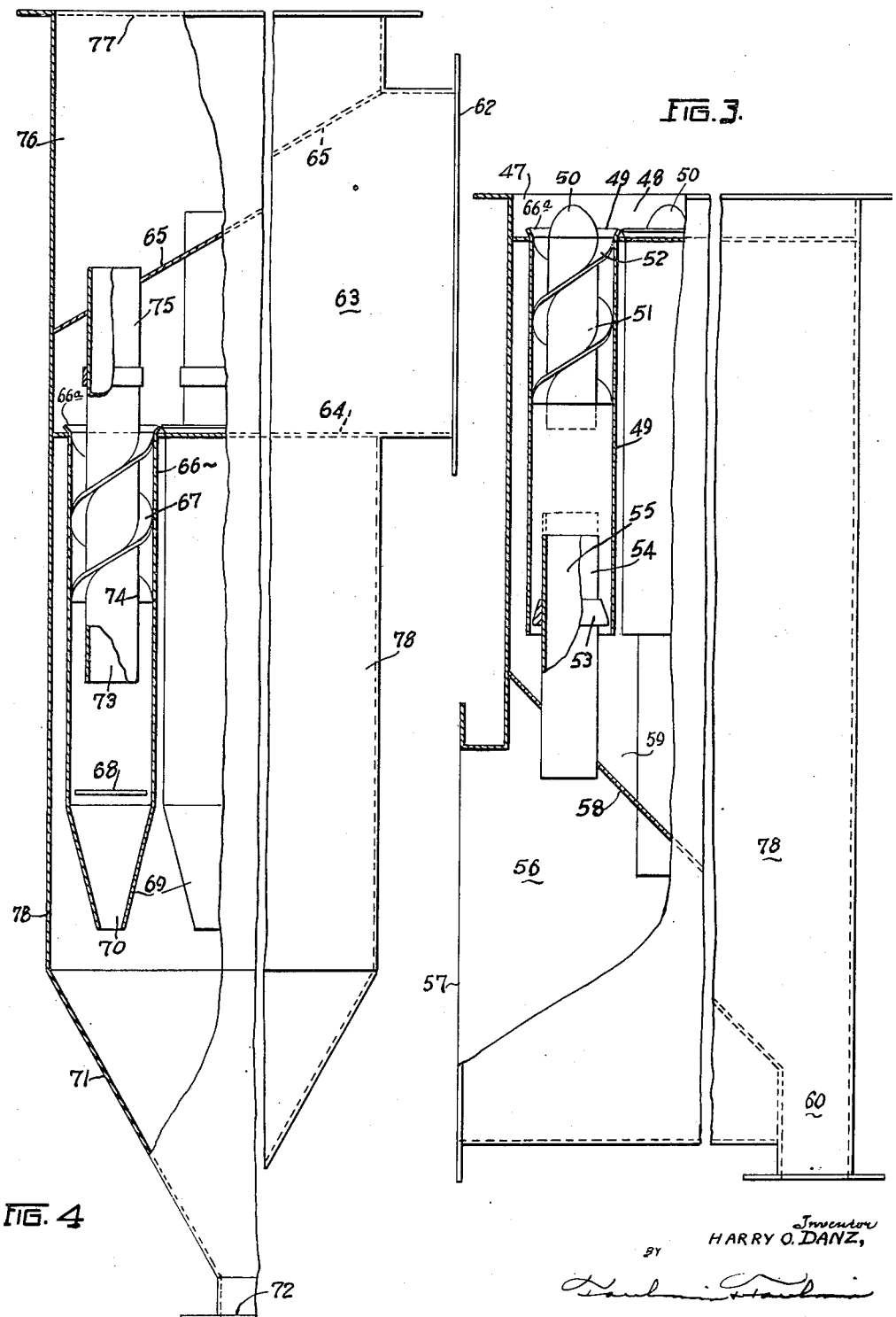

2,323,707

UNITED STATES PATENT OFFICE 2,323,707

TUBE TYPE COLLECTOR

Harry O. Danz, Detroit, Mich., assignor to American Blower Corporation, Detroit, Mich., a corporation of Delaware Application June 21, 1940, Serial No. 341,682

2 Claims. (Cl. 183—80)

My invention relates to dust collectors.

It is the object of my invention to separate and collect dust from air or gas.

An object of the invention is to provide a multiple tube dust collector wherein all of the inlet tubes that carry the dust ladened air open into a common dust collecting chamber, and wherein means is provided within the discharge end of the inlet tubes for directing the discharging dust from the inlet tubes in substantially parallel streams so that the discharging dust from adjacent tubes will not interfere with another or produce turbulence at the discharge end of the discharge tubes.

Another object of the invention is to provide a multiple tube dust collector wherein a baffle means is positioned in the discharge end of the inlet tubes for the dust ladened air so that the dust separated from the dust ladened air will discharge along the inner periphery of the inlet tubes into a common chamber, and wherein the baffle is positioned inwardly of the end of the discharge end of the inlet tubes so that the discharging streams of dust will flow from the tubes in substantially parallel streams and thus prevent interference between the discharging dust streams from adjacent tubes.

Another object of the invention is to provide a multiple tube dust collector in accordance with the foregoing objects wherein the clean air is discharged in the same direction as the dust but through a separate tube.

Another object of the invention is to provide a multiple tube dust collector in accordance with the first two objects wherein the clean air discharges from the inlet tubes in the direction opposite to the inlet flow.

Referring to the drawings:

Figure 1 is a side elevation partially in section, showing a primary unit arranged with the main tubes in a horizontal position, with an optional secondary collector.

Figure 2 is a similar view showing a similar arrangement except that the inlet and outlet tubes are on the same end of the unit.

Figure 3 shows a vertical unit similar to Figure 1, it being understood that while the center line of this unit is vertical, yet the unit can be placed at an angle such as, for instance, 45°.

Figure 4 is a view similar to Figure 3 showing a modification in arrangement similar to that shown in Figure 2.

Figure 5 is a cross sectional view of a portion of the inlet tube of the dust collector showing the use of a baffle in the discharge end thereof.

Figure 6 is a cross sectional view of a portion of the inlet tube of the dust collector showing the use of a cone on the end of the inlet tube.

Secondary collectors can also be applied in like manner to any one of the constructions of the other views, but a secondary collector is particularly adaptable to the form shown in Figures 1 and 3, but it is useful in all forms for such purposes as remote dust disposal and the like.

Referring to the drawings in detail, and in particular to Figure 1, it indicates an air or gas inlet into the chamber 2 formed by the end wall 3 and side walls 4. The remaining wall of this chamber is formed by the inlet tube sheet 5 which is provided with a plurality of openings 6 for receiving the inlet tubes 7 which are arranged in parallelism. The rear ends of these tubes 7 are supported within openings 8 in the intermediate tube sheet 9. Within the tube 7 is mounted a spinner or separator member 10 having an airfoil nose section 11 at its inlet end. This spinner or separator member 10 is maintained in spaced parallel relationship to the inside of the tube 7 by the helix 12. The rear end of the separator member at 13 is separated from the entrance end 14 of the outlet tube 15, the outlet end of which 16 is supported within the opening 17 of the outlet tube sheet 18. This outlet end 16 opens into the outlet chamber 19 formed by the sheet 18 on one side, the side walls 20 and 21, and the end wall 22. The outlet discharges at 23. Sheet 18 can also be at an angle. The entrance of the dust and gases can be from any direction.

Returning to the outlet tube 15, it will be noted on it is mounted a plate or conical deflector 24, the outer edge of which at 25a is spaced from the inside of the inlet tube 7. This space between 25a and 7 communicates with the interior of the chamber 25 formed by the intermediate tube sheet 9 and outlet tube sheet 18, the side walls 26 and hopper bottom 27 having an opening 28. 29 serves as a top for enclosing the structure. The exit 23 can be in any direction.

Referring to the operation of the construction shown in Figure 1, the dust laden air or gases enter through 1 into the chamber 2 where they enter the tubes 7 which divide the same into a plurality of parallel streams. Each stream has imparted to it a helical motion by the helix 12 so that the major portion of the dust as it is carried along with the air or gas is thrown outwardly against the inside periphery of the tube 7. This leaves the central part of each of these streams substantially dust free so that the dust free air will pass into the open end 14 of the outlet tube 15 and thence through the outlet end 16 of the tube 15 into the chamber 19 whence the dust free air passes outwardly through the exit opening 23.

The dust is discharged through the space between the deflector 24 at 25a and the inside of the tube 7. This dust enters the chamber 26 whence it passes through the opening 28. If a secondary collector is used, as shown, connected to the dust outlet 28, a percentage of air or gas is carried through with the dust. This carrying air is removed from the dust and usually discharged back through 83a into the inlet chamber 2 and the dust deposited in some suitable container.

Referring to Figure 2, 30a designates an inlet opening for dust together with gas or air. Such gases or air with the dust enters into the chamber 31 for admission into the tubes 32 and thus is divided into independent streams. The helix 33 imparts a helical motion so that the dust is thrown outwardly on the inside of the tube 32. The separator member core 34 extends an appreciable distance beyond the helix 33. Spaced from the left hand end of the tube 34 is a plate 36. The periphery of this plate 36 is spaced inwardly from the inside of the tube 32 leaving a clearance through which dust passes. Where cone 30 is used, it is provided with an outlet opening for dust and under certain conditions a percentage of gas or air. The opening is designated 38. The hopper 39 receives the material thus discharged which passes out through the opening 40 into a receptacle or into a secondary collector. The dust free air turns 180° and enters the open end 35 of the separator pipe 34. This dust free air is then discharged into the chamber 41 whence it passes out through the opening 42.

With reference to Figure 2, if you use the cone 30, the deflector plate 36 is not absolutely necessary. The reverse is also true that if you have the deflector plate you do not necessarily need the cone.

One of the advantages of the reverse flow type is the elimination of the necessity of a secondary collector with a consequent savings in cost, space and the like. While you can use the secondary, and it has some advantages under certain circumstances, yet generally speaking it is not necessary.

The first advantage of this construction in Figures 1 to 4 is the reduction of size and therefore the space requirements which are particularly critical in introducing a dust collector into a power house or similar installation.

It will be noted that the separator tubes 32 are mounted at the right hand end in the inlet tube sheet 43 and supported at the left hand end by the sheet 44. The separator tube 34 when extended at 34a becomes an outlet tube for dust free air or gas. In the previous Figure 1 where there is straight line flow the outlet tube 15 is spaced from the separator tube 10.

The tubes 32 are mounted within the usual casing 45 across which are arranged the plates or partitions 43 and 44. The partition 46 separates the inlet compartment 31 from the outlet compartment 41, and can be arranged angular as shown, or in steps (Figure 5) to facilitate manufacture.

Referring to Figure 3, which shows a vertical collector, it will be understood that this collector may be arranged at any desired angle such as 45° to the vertical. The air or gas inlet is at 47, or may be arranged with a chamber as Figures 1 and 2. The air or gas carrying the dust enters through the opening 47 into the chamber 48 and thence into its respective inlet tube 49 over the airfoil nose section 50 on the entering end of the separator tube 51 on which is mounted a helix 52. Thus the dust laden air is moved in a spiral path and the dust is thrown out centrifugally against the inside of the tube 49. The dust, with some air or gas when a secondary collector is used, passes along the inside periphery of the tube, out the end of the tube, over the deflector 53 which is mounted on the air outlet tube 54, through the open end of which at 55 the dust free air passes into the outlet chamber 56 and thence through the outlet opening 57. The tube 54 is mounted in a diagonal or stepped plate known as the outlet tube sheet designated 58. The dust discharged over the deflector 53 between the deflector and the inside of the tube 49 descends into the compartment 59 of which 58 is the bottom. The dust so deposited then descends to the outlet passage 60 and it may then pass into a secondary collector where any remaining or conveying air is separated from the dust, or it may be discharged into a receptacle or conveying system.

It will be noted that the outlet tubes 54 for clean air are of varying lengths so as to discharge at different points into the chamber 56. This chamber may also discharge vertically down or to either side.

Referring to Figure 4, the dust laden air or gases enter at 62 in a horizontal direction. They enter the compartment 63, the bottom of which is formed by the inlet tube sheet 64 and the top of which is formed by the diagonally arranged outlet tube sheet 65. The inlet tube sheet 64 has mounted therein a plurality of inlet tubes 66 on which are mounted a helix 67 that extends part way of the tube. The helix serves to throw the dust centrifugally outwardly against the periphery of the inside of the inlet tube 66. The dust thrown out continues downwardly between the periphery of the deflector plate 68 and the inside of the tube 66 into the hopper 71 whence the dust passes out through the opening 72, or when cone 69 is used dust passes from the tube 66 into cone 69 out of opening 70 into hopper 71 and out through opening 72. The dust free air is discharged centrally through the extended end 73 of the tube 74 on which is mounted the helix. This dust free air is discharged through the outlet pipe 75 that extends through the outlet tube sheet 65 whence the dust free air is discharged into the chamber 76 and thence through the opening 77. The chamber may discharge either vertically as shown, angularly, or horizontally as Figure 3. The inlet tubes may be belled as at 66a to facilitate entry (Figures 3 or 4) or they may be made straight as in Figures 1 and 2.

The casing 78 surrounding the several tubes 66 has its bottom closed by the hopper 71. The secondary collector is designated 79 (Figure 1). The dust with its associated air enters the passage 80 into the collector. The dust descends in a spiral of descending and contracting size due to the contracting portions 81, 82, etc., of the secondary collector while the dust free air passes out the passageway 83, and discharges to inlet chamber 2 or elsewhere.

A secondary collector shown as optional with Figure 1, is also optional with the rest of the construction shown in the other views. One of the advantages, however, of the reverse flow type in Figures 2 and 4 is the elimination of necessity, except under exceptional circumstances, of the secondary collector, thereby saving in space and cost. It also simplifies the installation and construction.

It will be understood that I desire to comprehend within this invention and the claims which follow hereinafter, such variations in construction and details as may be necessary to practice the principles of the invention.

Having thus fully described my invention, what I claim as new and desire to secure by Letters Patent is:

1. In a multiple tube dust collector, an air inlet chamber, a dust collecting chamber, a plurality of pipes of substantially uniform diameter disposed parallel with respect to one another and extending from said inlet chamber to said dust collecting chamber and opening directly thereinto for conveying dust laden air, means therein for imparting a helical movement to the air and dust whereby the dust is thrown out centrifugally on the interior of said pipes, a clean air pipe mounted within each of said first mentioned pipes at least a portion of the length thereof and extending beyond the end of the first mentioned pipes, means for receiving clean air from said clean air pipes, a baffle positioned upon each of said clean air pipes having the edge thereof positioned closely adjacent the wall of the first mentioned pipe and disposed inwardly of the end of said first mentioned pipe.

2. In a multiple tube dust collector, an air inlet chamber, a dust collecting chamber, a plurality of inlet tubes of substantially uniform diameter disposed parallel with respect to one another and extending from said inlet chamber to said dust collecting chamber and opening directly thereinto for conveying dust laden air, a clean air tube positioned within each of said inlet tubes at least a portion of the length thereof and extending beyond one end of said inlet tubes to receive clean air from the central portion of said inlet tubes and convey the same to means for receiving clean air, means within said inlet tubes for imparting a helical movement to the air and dust whereby the dust is thrown out centrifugally on the interior of said inlet tubes, and baffle means disposed within the discharge end of each of said inlet tubes having the edge thereof positioned adjacent the wall of said inlet tube and disposed inwardly of the end of said inlet tube.

HARRY O. DANZ.